US012618621B2

(12) United States Patent
Lee et al.

(10) Patent No.: US 12,618,621 B2
(45) Date of Patent: May 5, 2026

(54) PIPE CONNECTION ASSEMBLY OF HEAT EXCHANGER

(71) Applicant: Hanon Systems, Daejeon (KR)

(72) Inventors: Duck-Ho Lee, Daejeon (KR); Neung Kwon, Daejeon (KR); Ho Chang Sim, Daejeon (KR); Jong Du Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 903 days.

(21) Appl. No.: 17/798,740

(22) PCT Filed: Feb. 15, 2021

(86) PCT No.: PCT/KR2021/001912
§ 371 (c)(1),
(2) Date: Jan. 17, 2023

(87) PCT Pub. No.: WO2021/167305
PCT Pub. Date: Aug. 26, 2021

(65) Prior Publication Data
US 2023/0141369 A1     May 11, 2023

(30) Foreign Application Priority Data

Feb. 19, 2020     (KR) ........................ 10-2020-0020208
Feb. 5, 2021     (KR) ........................ 10-2021-0016430

(51) Int. Cl.
B23K 9/028          (2006.01)
F28F 9/02          (2006.01)
(Continued)

(52) U.S. Cl.
CPC .............. F28F 9/18 (2013.01); B23K 9/0288 (2013.01); F28F 9/0246 (2013.01); B23K 2101/14 (2018.08); F28F 1/126 (2013.01)

(58) Field of Classification Search
CPC ........ F28F 9/182; F28F 9/0256; F28F 9/0246; B23K 1/18; B23K 37/06
See application file for complete search history.

(56) References Cited

U.S. PATENT DOCUMENTS 2,460,667 A * 2/1949 Wurzburger ............ F16L 13/08
285/289.1
5,101,889 A * 4/1992 Potier .................. B23K 1/0012
228/183
(Continued)

FOREIGN PATENT DOCUMENTS

JP          2004101132 A          4/2004
JP          2008212949 A  *       9/2008
(Continued)

OTHER PUBLICATIONS

Translation of JP2008212949A named Translation-JP2008212949A (Year: 2008).*

(Continued)

*Primary Examiner* — Paul Alvare
(74) *Attorney, Agent, or Firm* — NORTON ROSE FULBRIGHT US LLP

(57)          ABSTRACT

The present invention relates to a pipe connection assembly of a heat exchanger for connecting a header tank and a pipe of the heat exchanger, in which a means for preventing a welding ring that fixes a manifold and a pipe from entering into a hollow at one end of the manifold before welding is disposed, and a space is formed between the inner surface of the one end of the manifold and the outer surface of the pipe, thereby preventing the molten welding ring from flowing out.

8 Claims, 14 Drawing Sheets

(51) Int. Cl.
   *F28F 9/18* (2006.01)
   *B23K 101/14* (2006.01)
   *F28F 1/12* (2006.01)

(56) References Cited

U.S. PATENT DOCUMENTS

| | | | | |
|---|---|---|---|---|
| 5,400,951 | A * | 3/1995 | Shiroyama | ....... F02M 35/10144 |
| | | | | 285/289.5 |
| 9,644,897 | B2 * | 5/2017 | Gu | .......................... F28F 9/001 |
| 10,697,568 | B2 * | 6/2020 | Nakajima | ................ B23K 1/18 |
| 2013/0319569 | A1 * | 12/2013 | Kikuno | .................. B23K 1/002 |
| | | | | 138/109 |
| 2017/0036306 | A1 | 2/2017 | Campbell et al. | |

FOREIGN PATENT DOCUMENTS

| | | | |
|---|---|---|---|
| KR | 20090091529 | A | 8/2009 |
| KR | 20160026750 | A | 3/2016 |
| KR | 20160087940 | A | 7/2016 |
| WO | 2014008037 | A1 | 1/2014 |

OTHER PUBLICATIONS

German Ecxamination Report issued on Mar. 19, 2024 in corresponding application No. DE 11 2021 001 106.5 , with English translation.

* cited by examiner

PIPE CONNECTION ASSEMBLY OF HEAT EXCHANGER

CROSS REFERENCE TO RELATED APPLICATIONS

This application is a national phase under 35 U.S.C. § 371 of International Application No. PCT/KR2021/001912 filed on Feb. 15, 2021, which claims benefit of priority from Korean Patent Application Nos. 10-2021-0016430 filed on Feb. 5, 2021 and 10-2020-0020208 filed on Feb. 19, 2020. The entire contents of these applications are incorporated herein by reference in their entirety.

TECHNICAL FIELD

The present invention relates to a pipe connection assembly of a heat exchanger, and more particularly, to an assembly connecting an inlet and an outlet formed on a header tank of a heat exchanger and a pipe to each other.

BACKGROUND ART

In general, heat exchangers are devices installed on specific flow paths so as to perform heat exchange in such a way that a heat exchange medium circulating inside absorbs heat from the outside or radiates heat to the outside. Such heat exchangers are variously manufactured depending on use purposes, like a condenser and an evaporator using a refrigerant as a heat exchange medium, a radiator and a heater core using a coolant as a heat exchange medium, an oil cooler using oil used in an engine, a transmission, and the like, as a heat exchange medium, or the like.

In this case, the heat exchanger generally has a form in which a header tank is coupled to both ends of a plurality of tubes through which heat transfer is performed between an internal fluid and an external fluid. In addition, a manifold including an inlet and an outlet through which a heat exchange medium flows is configured in the header tank, and a pipe is fixedly coupled to the manifold, such that a heat exchange medium is introduced from another engine or a heat exchange medium of which heat transfer is performed is discharged to another engine. An evaporator, which is a type of such a heat exchanger, is disclosed in Korean Patent Laid-Open Publication No. 10-2016-0026750 (entitled "Evaporator" and hereinafter referred to as "Related Art Document 1").

Referring to FIG. 1, an evaporator 1 according to Related Art Document 1 may be configured to include a first header tank 2a, a second header tank 2b, an inlet pipe 3, an outlet pipe 4 and a core part 5. In this case, the evaporator 1 may include a function of cooling air introduced by a blower by heat exchange in a process in which a liquid heat exchange medium is changed to a gaseous state and supplying the cooled air into the interior. In addition, the heat exchange medium may be introduced into the inlet pipe 3 and discharged from the outlet pipe 4, and may flow on the first header tank 2a or the second header tank 2b partitioned into two rows by an internal partition wall. Accordingly, Related Art Document 1 has provided the evaporator 1 having a plurality of pass flows by disposing a manifold including the inlet pipe 3 and the outlet pipe 4 in any one of the first header tank 2a or the second header tank 2b.

Next, referring to FIG. 2, in the related art, a welding process has been performed through a pipe connection assembly including a welding ring 7c so as to connect the manifold 7a including the inlet pipe or the outlet pipe as described above and a pipe 7b of which a flow path is connected to other components in a vehicle to each other. Here, in the welding process according to the related art, a welding ring 7c was disposed on an outer surface of the pipe 7b, and when the pipe 7b is partially inserted into the manifold 7a, the pipe 7b and the manifold 7a have been fixed to each other by applying heat to the welding ring 7c through a welding torch or the like. However, in the related art, a problem that the molten welding ring 7c overflows to the outside of the manifold 7a has occurred due to a narrow space between the outer surface of the pipe 7b and an opening of the manifold 7a. Accordingly, there was a disadvantage that the heat exchanger is contaminated due to the residual welding ring 7c disposed on the outside of the manifold 7a and the pipe 7b.

Currently, in order to solve the problems as described above, technologies such as Korean Patent Laid-Open Publication No. 10-2016-0087940 (entitled "Welded Construction of Inlet and Outlet Pipes of Heat Exchanger" and hereinafter referred to as "Related Art Document 2") have been disclosed. As illustrated in FIG. 3, in Related Art Document 2, an opening of a manifold 8a is formed to have a greater diameter than a welding ring 8c, such that a portion of the welding ring 8c is inserted into the opening of the manifold 8a. However, since a welding torch used in a welding process first heats an outer portion of the welding ring 8c, there is a problem that a portion of the welding ring 8c introduced into the opening of the manifold 8a is relatively slowly molten, such that the first molten outer portion of the welding ring 8c overflows to the outside along a distal end portion of the opening.

DISCLOSURE

Technical Problem

An object of the present invention is to provide a pipe connection assembly of a heat exchanger in which a space between an inner surface of one end of a manifold and an outer surface of a pipe may be secured so that a molten welding ring is accommodated and the welding ring may be exposed to the outside in a welding process.

Technical Solution

In one general aspect, a pipe connection assembly of a heat exchanger connecting a header tank and a pipe of the heat exchanger to each other includes: a manifold having one end connected to the pipe and the other end connected to an inner portion of the header tank so that a heat exchange medium flows; and a welding ring disposed at one end of the manifold so that the manifold and the pipe are fixedly coupled to each other, wherein the welding ring is disposed on one end surface of the manifold, and a space is formed between an inner surface of one end of the manifold and an outer surface of the inserted pipe, such that the molten welding ring is accommodated.

In addition, the manifold may have a protrusion part protruding toward a hollow inner portion and disposed on an inner surface of one end.

In addition, one end of the manifold may include a first body and a second body connected to one end of the first body and having an inner diameter greater than that of the first body, and the protrusion part may be disposed on the second body.

In addition, the welding ring may be disposed to be seated on the protrusion part.

In addition, in the manifold, an inner diameter of the second body may be formed to be smaller than an outer diameter of the welding ring, such that a portion of the welding ring is seated on the second body.

In addition, in the manifold, a length difference between the outer diameter of the welding ring and the inner diameter of the second body may be formed to be smaller than a clearance between an inner surface of the welding ring and the outer surface of the pipe.

In addition, the inner diameter of the second body may be formed to be greater than the outer diameter of the welding ring, such that a thickness of inner and outer sides of the welding ring is smaller than a clearance between an inner surface of the second body and the outer surface of the pipe.

In addition, the second body may have an inner diameter that becomes narrower toward the first body.

In addition, a portion of the pipe may be depressed inward so that a clearance between an inner surface of the second body and the outer surface of the pipe increases.

In addition, the number of protrusion parts may be plural, and the plurality of protrusion parts may be disposed to be spaced apart from each other along an inner circumferential surface of the second body.

In addition, the welding ring may have a projection part protruding outward and disposed on an outer surface thereof.

In addition, an outer diameter of the projection part may be formed to be greater than an inner diameter of one end side of the manifold, such that the welding ring is disposed on one end surface of the manifold.

In addition, the number of projection parts may be plural, and the plurality of projection parts may be disposed to be spaced apart from each other along an outer circumferential surface of the welding ring.

In another general aspect, a heat exchanger includes: a pair of header tanks disposed to be spaced apart from each other; a core part including a plurality of tubes having both ends coupled to the pair of header tanks, respectively, and disposed to be spaced apart from each other in both side directions, and a plurality of fins interposed between the plurality of tubes; and a pipe connection assembly coupled to one or more of the header tanks among the pair of header tanks, wherein the heat exchange medium flowing inside the header tank is introduced or discharged through the pipe connection assembly.

Advantageous Effects

In the pipe connection assembly of a heat exchanger according to the present invention having the configuration described above, a space is formed in a cup shape at an end portion of the manifold, such that a molten welding ring may be accommodated, and the welding ring may be prevented from being introduced into the space before a welding process. Accordingly, the present invention has not only an advantage of preventing welding by-products of the welding ring from flowing down to the outside of a manifold, but also an advantage of solving a problem such as a welding defect at the time of performing welding using a torch.

In addition, the present invention may allow a molten welding ring to be properly introduced into the space when heat is applied from the outside to the welding ring, according to settings of diameters (or radii) relationship between components of the pipe connection assembly of a heat exchanger.

BEST MODE

Hereinafter, a pipe connection assembly of a heat exchanger according to various embodiments of the present invention having the configuration as described above will be described in detail with reference to the accompanying drawings.

First Embodiment

Figure 1:
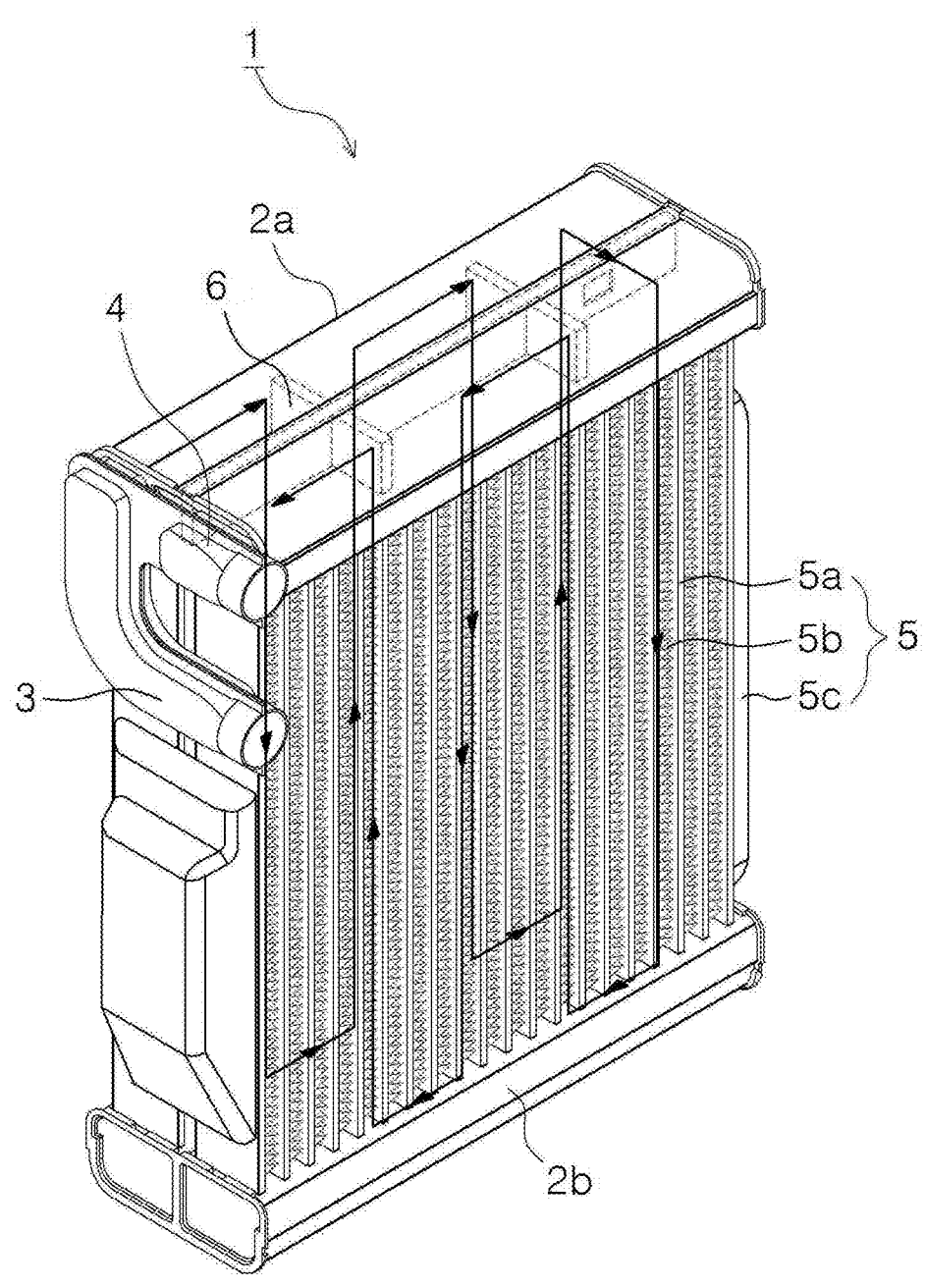
FIG. 1 is a perspective view of an evaporator according to the related art.
Figure 2:
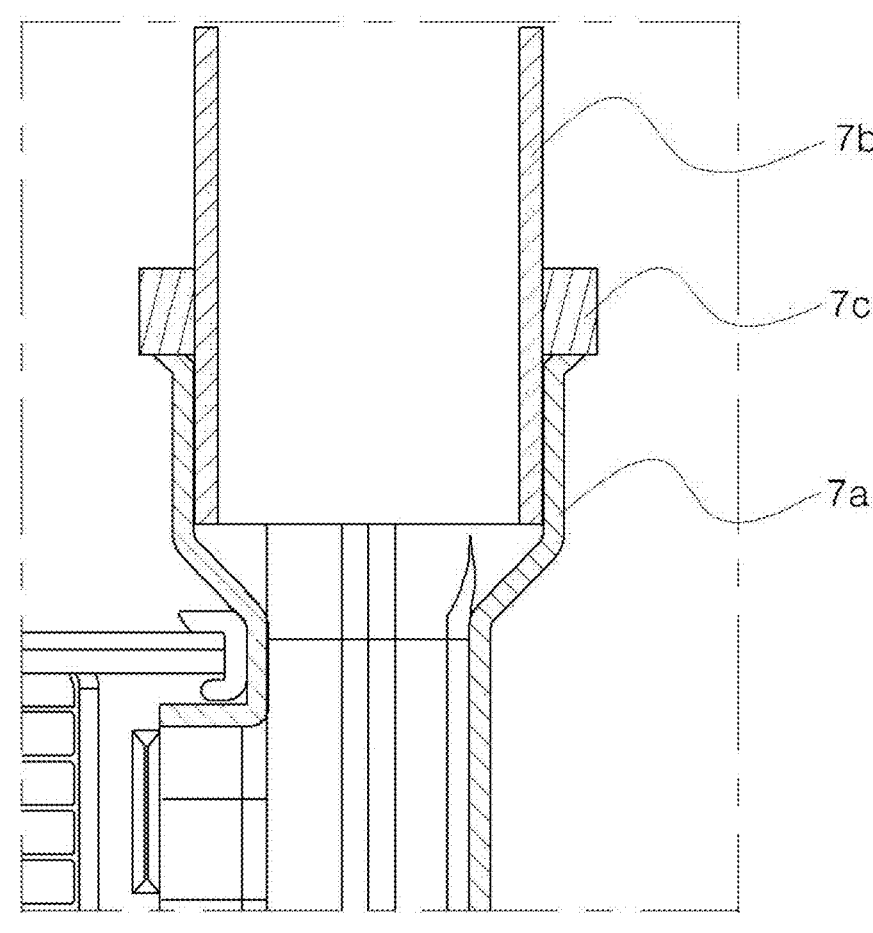
FIGS. 2 and 3 are cross-sectional views of a pipe connection assembly according to the related art.
Figure 3:
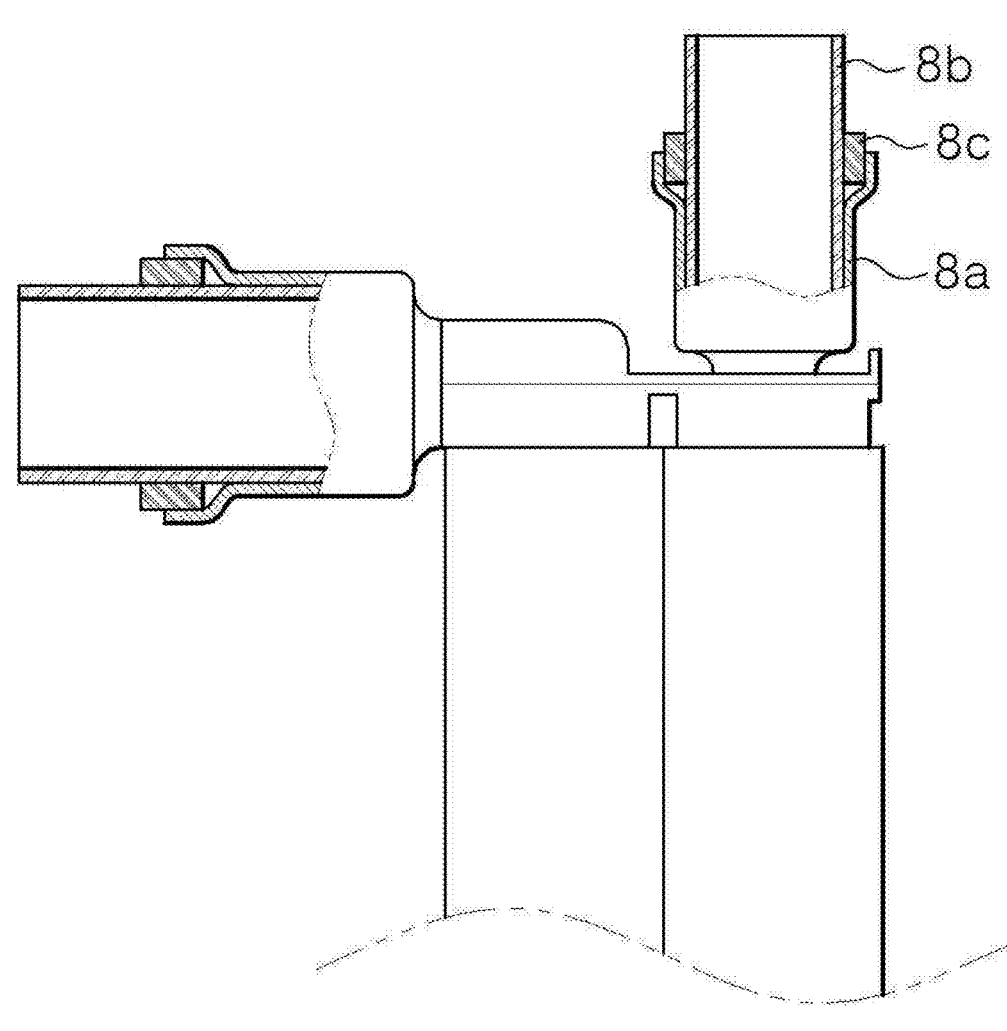
Figure 4:
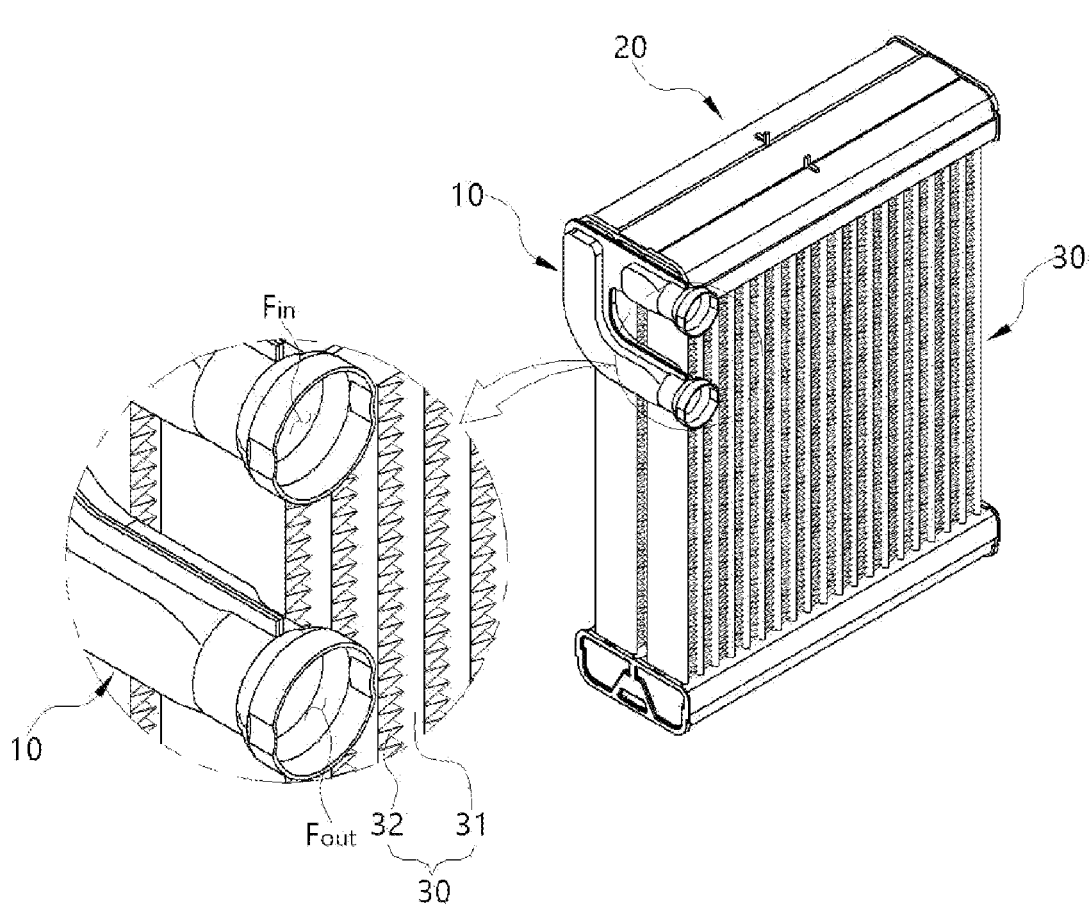
FIG. 4 is a perspective view of a heat exchanger according to a first embodiment of the present invention.
Figure 5:
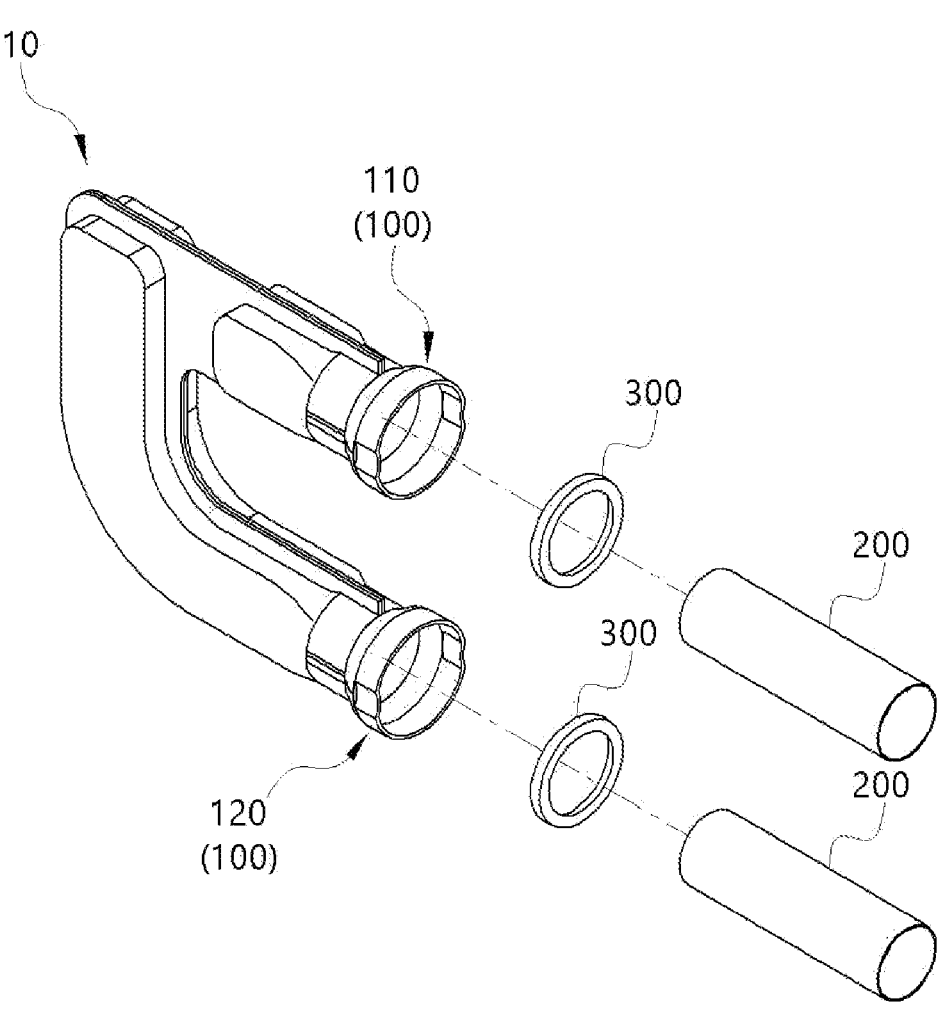
FIG. 5 is an exploded perspective view of a pipe connection assembly according to a first embodiment of the present invention.

FIGS. 4 and 5 illustrate a pipe connection assembly of a heat exchanger according to a first embodiment of the present invention, wherein FIG. 4 is a perspective view of the heat exchanger, and FIG. 5 is an exploded perspective view of the pipe connection assembly.

Referring to FIG. 4, the heat exchanger according to the present invention may include a manifold connection part 10, header tanks 20, and a core part 30. In this case, the manifold connection part 10 may have a heat exchange medium introduced thereinto ($F_{in}$) and discharged therefrom ($F_{out}$), and may be fixedly coupled onto the header tank 20. In addition, the header tanks 20 may be formed as a pair and be disposed to be spaced apart from each other in a height direction, and both ends of tubes 31 of the core part 30 in the height direction may be coupled to the pair of header tanks 20, respectively. In addition, the manifold connection part 10 may include an inlet through which the heat exchange medium is introduced ($F_{in}$) and an outlet through which the heat exchange medium is discharged ($F_{out}$), and the inlet and outlet may be configured in various structures such as a structure in which they are both coupled to one header tank 20 or are coupled to the pair of header tank 20, respectively, or a plurality of inlets and outlets are configured and coupled to the header tanks 20. In addition, the core part 30 may include a plurality of tubes 31 disposed to be spaced apart from each other in a length direction and further include fins 32 interposed between the plurality of the tubes 31. Here, since the heat exchanger according to the present invention may be formed as an evaporator, the heat exchange medium may flow inside the manifold connection part 10, the header tanks 20, and the tubes 31, and air introduced by a blower may flow to the fins 32. Therefore, the air may be cooled and supplied to the interior of a vehicle while the flowing heat exchange medium is evaporated. In addition, although not illustrated, a partition wall partitioning the interior into two or more rows, a baffle implementing a plurality of pass flows, or the like, may be further included in the header tank 20 according to the present invention.

The heat exchange medium will be described in more detail through a structure between the above components. When the heat exchange medium is introduced into the inlet of the manifold connection part 10, the heat exchange medium may be distributed to the plurality of tubes 31 through the header tank 20, and heat-exchanged with a fluid flowing outside the tube 31. In addition, the heat exchange medium may flow along paths constituted by the header tank 20 and the tubes 31, and the heat exchange medium that is heat-exchanged may be discharged through the outlet of the manifold connection part 10. Here, the inlet and the outlet of the manifold connection part 10 may be connected to pipelines to be configured so that the heat exchange medium is introduced from another engine or discharged to another engine.

Referring to FIG. 5, the manifold connection part 10 may include one or more manifolds 100, and the manifold 100 may be formed as an inlet 110 or an outlet 120. In addition, a welding ring 300 may be disposed between the manifold 100 and a pipe 200 so that the manifold 100 and the pipe 200 may be fixedly coupled to each other. In this case, the welding ring 300 may be molten through a welding process to fixedly couple the manifold 100 and the pipe 200. Hereinafter, the pipe connection assembly according to the present invention to be described may include a structure between the manifold 100 and the pipe 200 described above, and an end portion of the manifold 100 connected to the pipe 200 will be defined as one end and a direction in which the manifold 100 is connected to the header tank 20 will be defined as the other end direction. In this case, the manifold 100 may be connected to the header tank 20 through a separate housing of the manifold connection part 10 as illustrated or may be installed to be directly connected to the header tank 20 although not illustrated, and an illustrated structure is merely an example for more clearly describing the present invention, but the present invention is not limited thereto.

Figure 6:
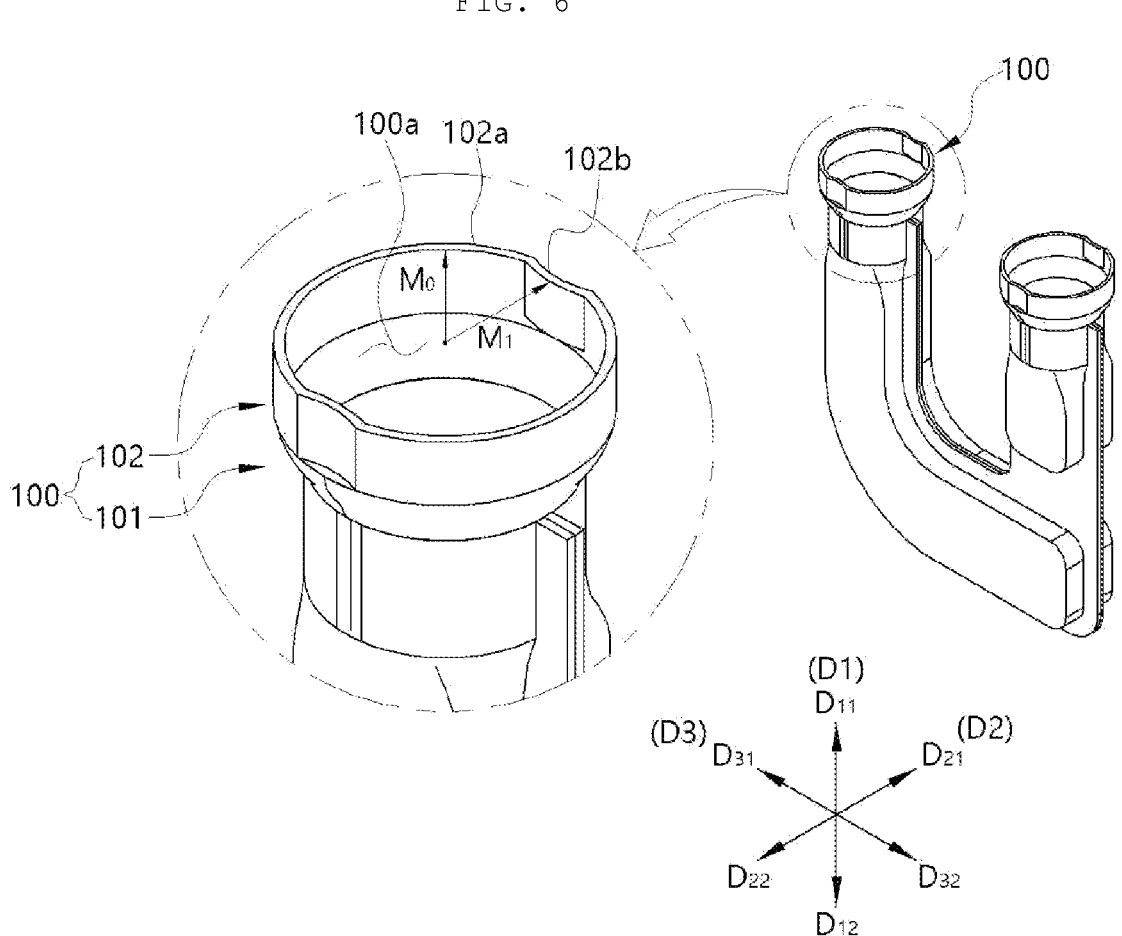
FIG. 6 is a perspective view and an enlarged view of a main part of a manifold according to a first embodiment of the present invention.
Figure 7A:
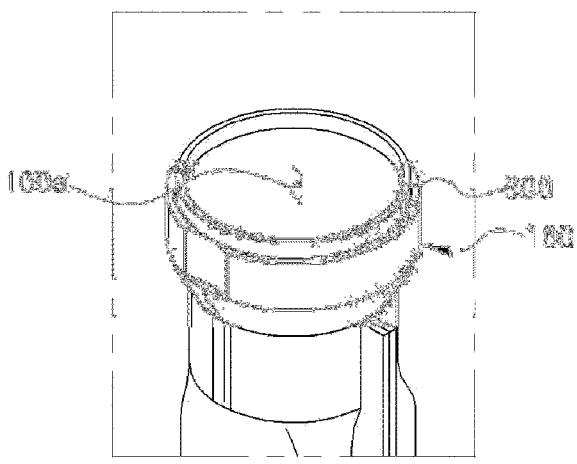
FIGS. 7A and 7B are views illustrating an assembling process of the pipe connection assembly according to a first embodiment of the present invention.
Figure 7B:
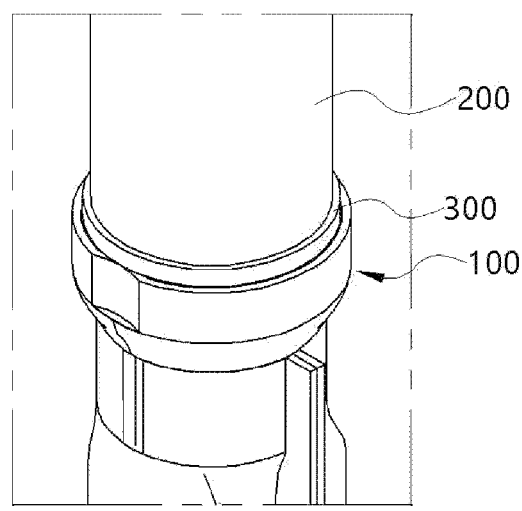

FIG. 6, FIGS. 7A to 7B illustrate the pipe connection assembly of a heat exchanger according to a first embodiment of the present invention, wherein FIG. 6 is a perspective view and an enlarged view of a main part of a manifold, and FIGS. 7A and 7B are views illustrating an assembling process of the pipe connection assembly.

Referring to FIG. 6, the manifold 100 according to the present invention may be opened on one side, and hereinafter, in order to more clearly describe the present invention, a side on which the manifold 100 is opened will be defined as an upper side $D_{11}$, an opposite direction to the upper side will be defined as a lower side $D_{12}$, commonly as a vertical direction $D_1$. In addition, the manifold 100 may have a body extending so that an inner portion thereof is hollow on the basis of a front and rear ($D_2$) and left and right ($D_3$) plane perpendicular to the vertical direction $D_1$, and may extend in a shape such as a circular shape or a polygonal shape according to a form of the manifold 100. In this case, on the basis of the front and rear and left and right plane, a direction toward a center point of the hollow will be defined as an inner side, and an opposite direction to the inner side will be defined as an outer side. In addition, as the body having a predetermined thickness extends, a diameter of an outer surface of the body will be defined as an outer diameter, a diameter of an inner surface of the body will be defined as an inner diameter, a distance from the center of the hollow to the outer surface will be referred to as an outer radius, and a distance from the center of the hollow to the inner surface will be referred to as an inner radius. In addition, in consideration of a case where the front and rear and left and right plane of the body has an irregular or polygonal shape, the outer diameter and inner diameter will be defined as two times the outer radius and two times the inner radius, respectively.

The manifold 100 may include a first body 101 and a second body 102, and a hollow part 100a penetrating in the vertical direction may be hollow in the manifold 100. In this case, the first body 101 may be a body extending vertically, and the second body 102 may be connected to an upper end of the first body 101 and extend upward. Here, an inner diameter of the second body 102 may be formed to be greater than an inner diameter of the first body 101, and the second body 102 may have an inner diameter formed as a 1-1-th radius $M_0$. In addition, the second body 102 may include an extension member 102a having the 1-1-th radius $M_0$ and a protrusion part 102b having a shape in which it protrudes toward the hollow part 100a on the extension member 102a. In this case, an inner end portion of the protrusion part 102b may have a 1-2-th radius $M_1$, which may be formed to be smaller than the 1-1-th radius $M_0$. Here, the number of protrusion parts 102b may be plural, the plurality of protrusion parts 102b may be formed and disposed to be spaced apart from each other along an inner circumferential surface of the second body 102, and some of the plurality of protrusion parts 102b may be disposed in directions symmetrical to each other with respect to the center of the hollow part 100a.

Referring to FIGS. 7A and 7B together, in a welding process using the pipe connection assembly according to the present invention, the welding ring 300 may be disposed on an upper end surface of the manifold 100 before welding, and the pipe 200 may be introduced into the hollow part 100a of the manifold 100 in a state in which the welding ring 300 is disposed. In this case, as described above, in the second body 102 of the manifold 100, a space may be formed as the extension member 102a is disposed at the uppermost end and an inner surface is spaced apart from an outer surface of the pipe 200, such that a space may be formed. Here, when the welding ring 300 is molten, the welding ring 300 may be introduced into the space. In addition, the protrusion part 102b of the second body 102 may prevent the welding ring 300 from being introduced into the space to support the welding ring 300 to be exposed to the outside before the welding.

Figure 8A:
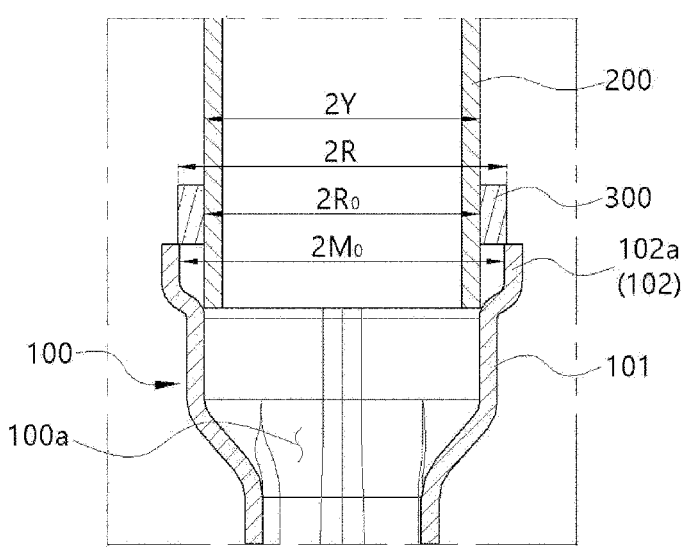
FIGS. 8A, 8B and 9 are cross-sectional views of the pipe connection assembly according to a first embodiment of the present invention.
Figure 8B:
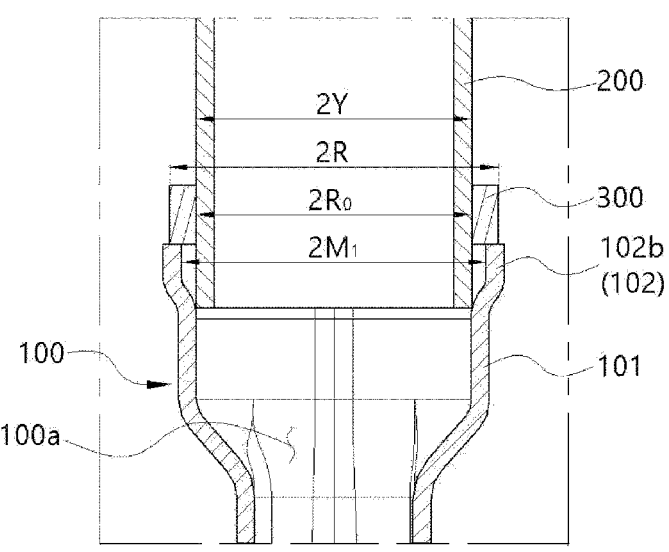
Figure 9:
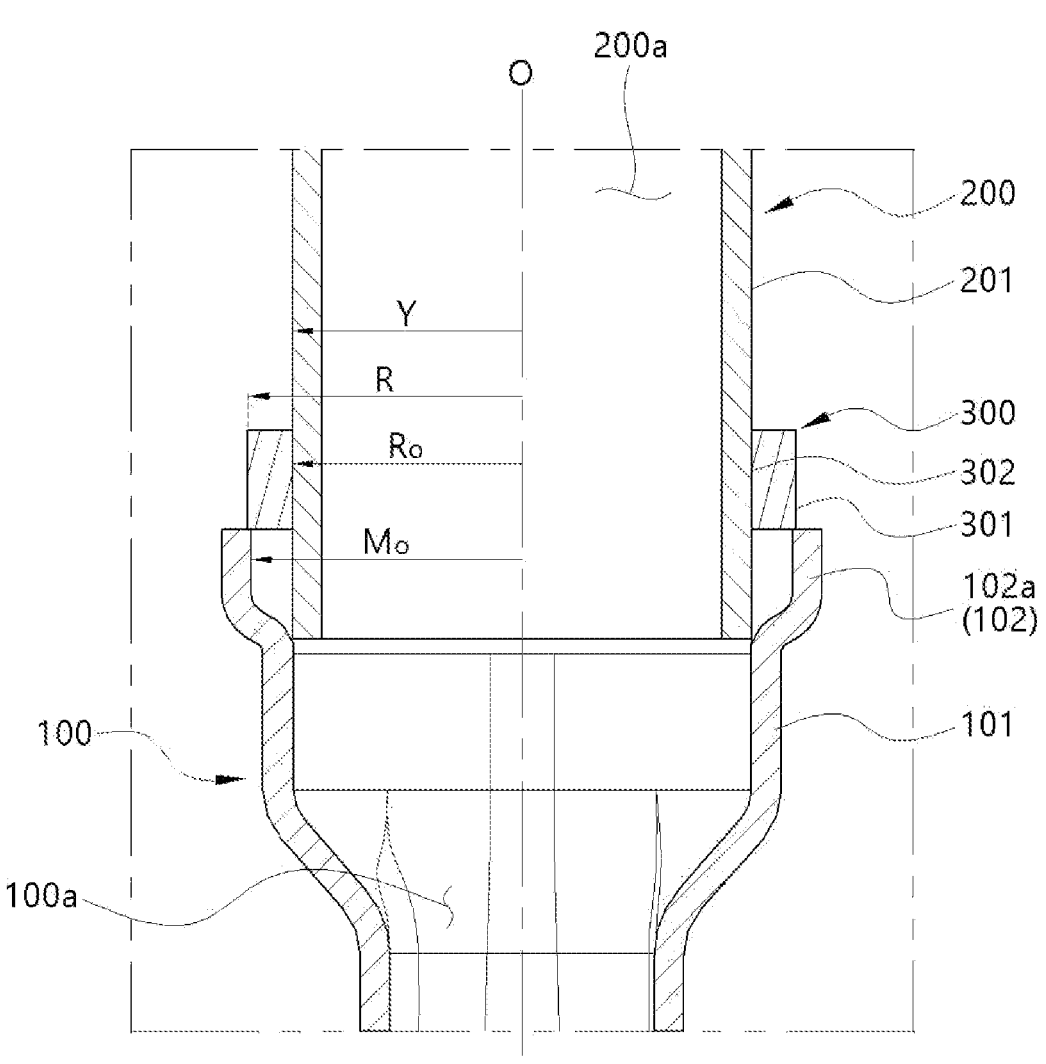

FIGS. 8A, 8B and 9 illustrate the pipe connection assembly of a heat exchanger according to a first embodiment of the present invention, wherein FIGS. 8A, 8B and 9 are side cross-sectional views of the pipe connection assembly. In this case, FIGS. 8A and 9 are side cross-sectional views taking along the extension member of one end of the manifold, and FIG. 8B is a side cross-sectional view cut taken along the protrusion part of one end of the manifold.

Referring to FIGS. 8A and 8B, the pipe 200 may be formed so that a diameter 2Y of an outer surface thereof has a second radius Y, and the welding ring 300 may be formed so that a diameter 2R of an outer surface and a diameter $2R_0$ of an inner surface thereof have a third radius R and a 3-1-th radius $R_0$, respectively. In this case, as described above, inner surfaces of the extension member 102*a* and the protrusion part 102*b* of the second body 102 may be formed to have the 1-1-th radius $M_0$ and the 1-2-th radius $M_1$, respectively, the respective radii may have lengths formed according to the following Relational Equation 1.

$$0 < Y \leq R_0 < M_1 < M_0 < R \qquad \text{[Relational Equation 1]}$$

That is, since the 1-1-th radius $M_0$ and the 1-2-th radius $M_1$ of the second body 102 are formed to be smaller than the third radius R of the outer surface of the welding ring 300, a portion of a lower surface of the welding ring 300 may be seated on the extension member 102*a* of the second body 102, and the other portion of the lower surface of the welding ring 300 may be seated on the protrusion part 102*b* of the second body 102. In addition, since the inner surface of the second body 102 and the outer surface of the pipe 200 are spaced apart from each other by a predetermined distance, an empty space is formed. Therefore, when the welding ring 300 is molten, the welding ring 300 may be introduced into the space. In this case, the inner diameter of the first body 100 may be formed to correspond to or different from the outer diameter of the pipe 200, and when the inner diameter of the first body 100 corresponds to the outer diameter of the pipe 200, the first body 100 and the pipe 200 may be coupled to each other so as to be tightly engaged with each other.

Alternatively, the above-described second body 102, the pipe 200 and the welding ring 300 may be formed to have lengths according to the following Relational Equation (2).

$$0 < Y \leq R_0 \leq M_1 < R < M_0 \qquad \text{[Relational Equation 2]}$$

This means that the inner diameter of the extension member 102*a* of the second body 102 is formed to be greater than the outer diameter of the welding ring 300 and the inner diameter of the protrusion part 102*b* of the second body 102 is formed to be smaller than the outer diameter of the welding ring 300, and the welding ring 300 may be prevented from being introduced into the empty space before welding through the protrusion part 102*b*.

Referring to FIG. 9, a clearance $(R_0 - Y)$ may be formed between an inner diameter of the welding ring 300 and the outer diameter of the pipe 200 in consideration of assemblability. In addition, as described above, the inner diameter of the extension member 102*a* may be formed to be greater than the outer diameter of the welding ring 300, and a length difference $(R - M_0)$ between the inner diameter of the extension member 102*a* and the outer diameter of the welding ring 300 may be formed to be the same as or different from the clearance $(R_0 - Y)$. As an example, the clearance and the length difference $(R - M_0)$ may be formed through the following Relational Equation (3).

$$R - M_0 < R_0 - Y \qquad \text{[Relational Equation 3]}$$

In a case where the clearance and the length difference $(R - M_0)$ are formed as in Relational Equation (3), when the welding ring 300 is biased toward one side, the welding ring 300 may be introduced into the space between the inner surface of the second body 102 and the outer surface of the pipe 200, but the insertion of the welding ring 300 may be limited through the protrusion part 102*b* of the second body 102 described above.

Second Embodiment

Figure 10:
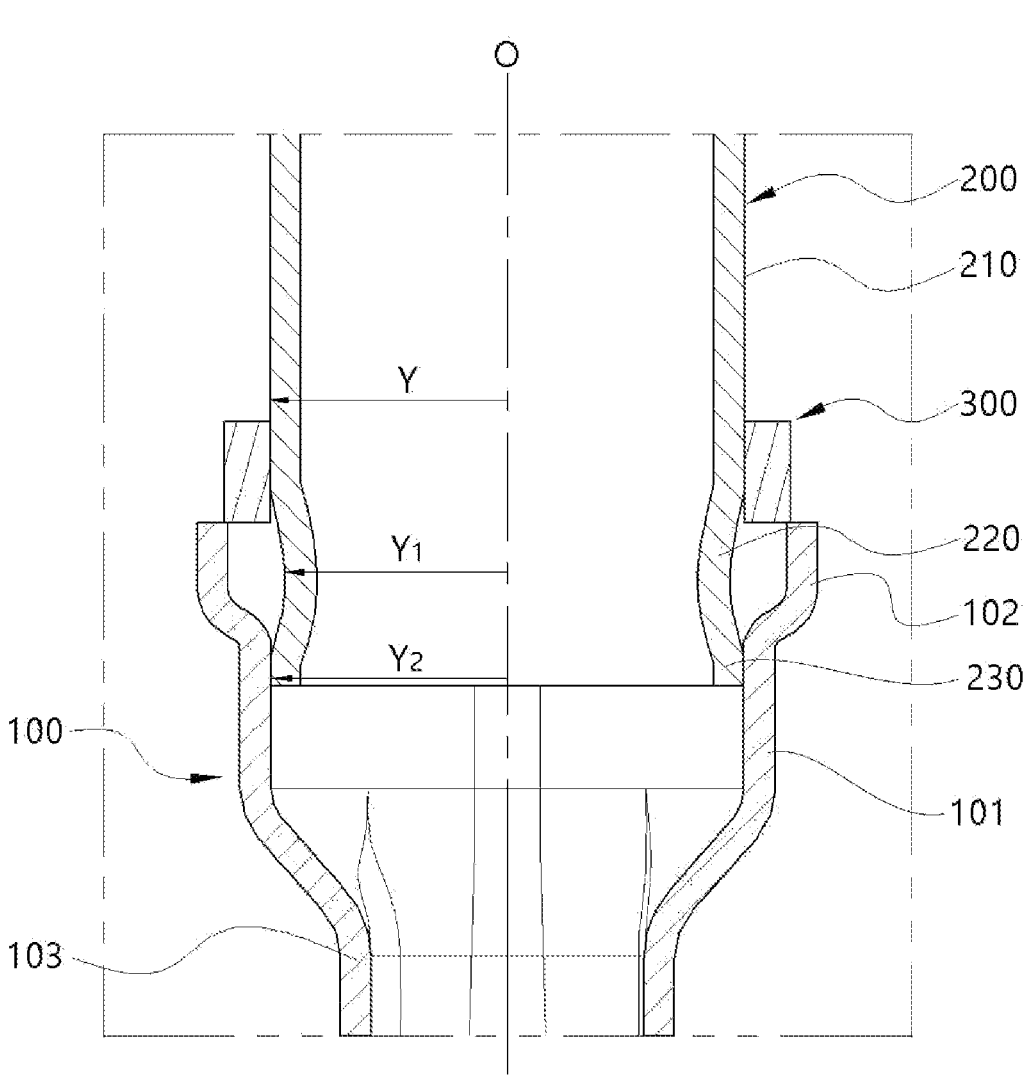
FIG. 10 is a side cross-sectional view of a pipe connection assembly according to a second embodiment of the present invention.

FIG. 10 illustrates a pipe connection assembly of a heat exchanger according to a second embodiment of the present invention, and FIG. 10 is a side cross-sectional view of the pipe connection assembly.

Referring to FIG. 10, the pipe 200 of the pipe connection assembly according to the present invention may be formed so that an outer surface of a lower end thereof is depressed inward. In this case, the pipe 200 may include a first pipe body 210 extending in the vertical direction so that an outer diameter thereof has a second radius Y and a second pipe body 220 connected to a lower end of the first pipe body 210 and having an outer diameter formed to have a 2-1-th radius $Y_1$, as described above. In this case, the 2-1-th radius $Y_1$ is formed to have a length smaller than the second radius Y, and thus, the second pipe body 220 may be configured in a shape in which it is depressed inward. In this case, the term "inward" may be a hollow inward direction of the pipe 200, and the second radius Y and the 2-1-th radius $Y_1$ are radii based the center of a hollow inner portion of the pipe 200.

In addition, the pipe 200 may further include a third pipe body 230 connected to a lower end of the second pipe body 220. In this case, the third pipe body 230 may have an outer diameter formed as a 2-2-th radius $Y_2$, and the 2-2-th radius $Y_2$ may be formed to be grater than the 2-1-th radius $Y_1$. In addition, the 2-2-th radius $Y_2$ may be formed as a length that is the same as or different from as the second radius Y.

In addition, the manifold 100 may further include a third body 103 extending downward of the first body 101. In this case, an inner diameter of the third body 103 is formed to be smaller than the inner diameter of the first body 101 and the outer diameter of the lower end of the pipe 200, and thus, an insertion depth of the pipe 200 may be limited.

Third Embodiment

Figure 11A:
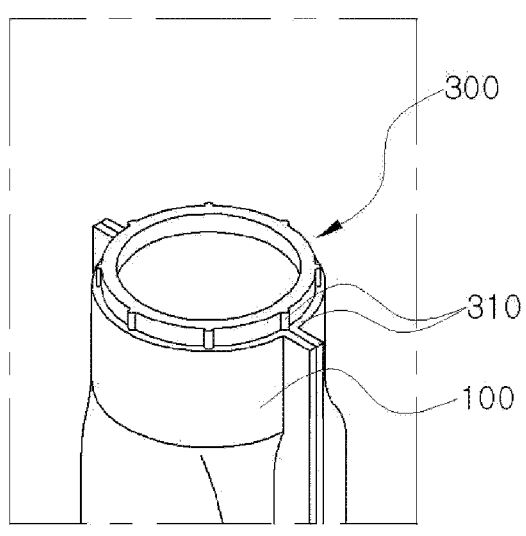
FIGS. 11A and 11B are views illustrating an assembling process of a pipe connection assembly according to a third embodiment of the present invention.
Figure 11B:
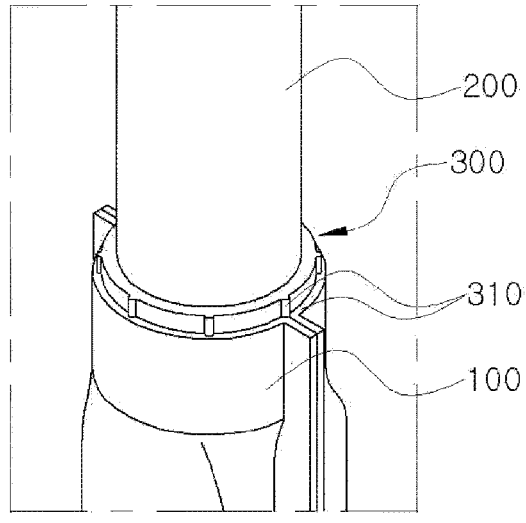
Figure 12:
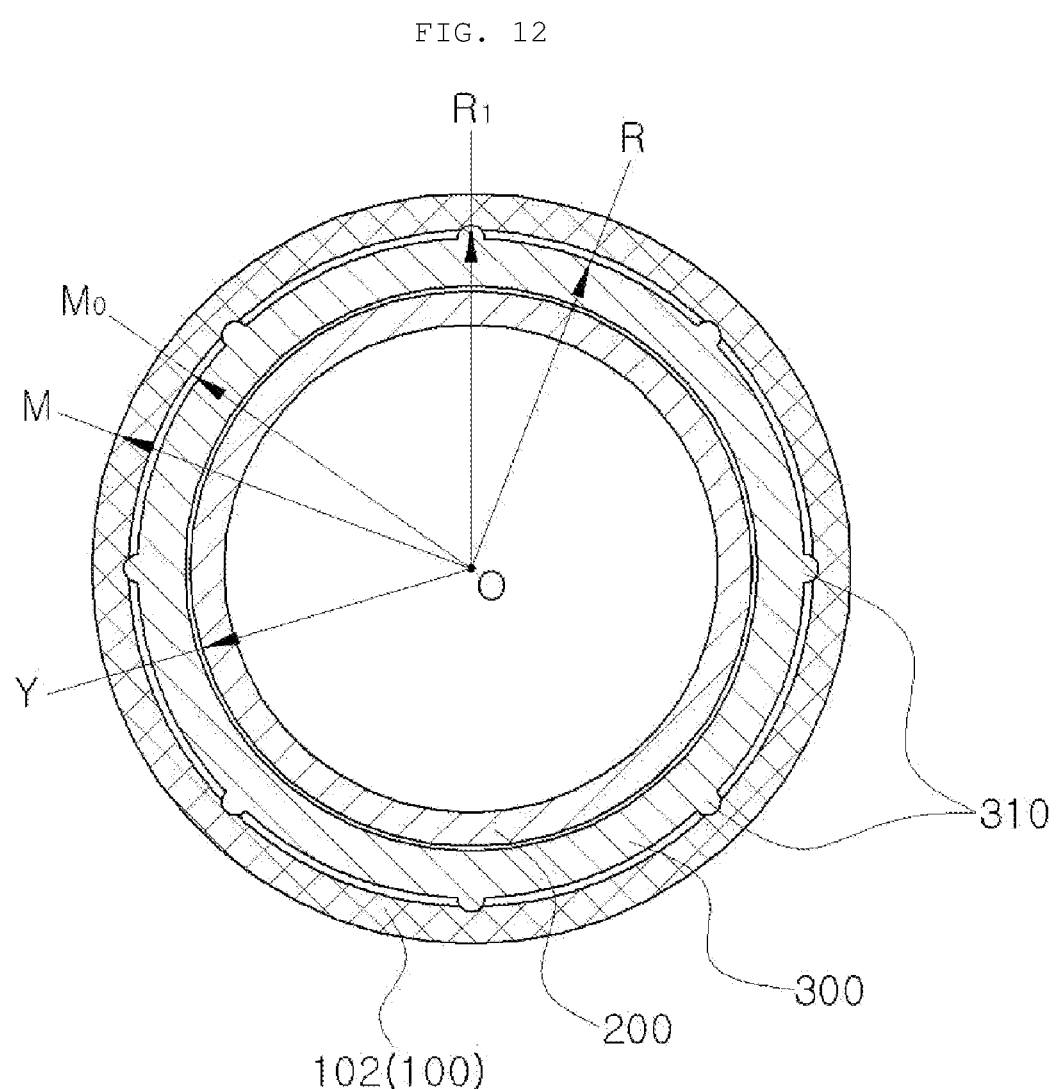
FIG. 12 is a plan cross-sectional view of the pipe connection assembly according to a third embodiment of the present invention.

FIGS. 11A, 11B and 12 illustrate a pipe connection assembly of a heat exchanger according to a third embodiment of the present invention, wherein FIGS. 11A and 11B are views illustrating an assembling process of the pipe connection assembly and FIG. 12 is a plan cross-sectional view of the pipe connection assembly.

Referring to FIGS. 11A and 11B, the welding ring 300 may be disposed on a point where the manifold 100 and the pipe 200 are in contact with each other. In more detail, when it is defined that one end of the manifold 100 is connected to the pipe 200 as illustrated in FIG. 6 and the other end of the manifold 100 is connected to the header tank as described above, the welding ring 300 may be disposed on one end side of the manifold 100, as illustrated in FIG. 11A. In addition, a hollow may be formed in each of one end of the manifold 100 and the welding ring 300, and as illustrated in FIG. 11B, the pipe 200 may be inserted into the hollow. Next, in the present invention, when the pipe 200 is inserted into the hollow of the manifold 100, the welding ring 300 is molten through a welding torch or the like, such that the manifold 100 and the pipe 200 may be welded and coupled to each other. In this case, as an embodiment of the welding process, one end of the manifold 100 is disposed to face an upward direction, and the welding ring 300 may be formed to be seated on an upper side of one end of the manifold 100. In addition, the welding ring 300 may be molten to be accommodated while permeating into a gap between the outer surface of the pipe 200 and the inner surface of the manifold 100. Here, the present invention may be characterized in that a projection part 310 protruding outward is formed on the outer surface of the welding ring 300. In addition, the number of projection parts 310 may be one or plural, and when the plurality of projection parts 310 are configured, the plurality of projection parts 310 may be disposed to be spaced apart from each other along an outer circumferential surface of the welding ring 300.

A structure relationship between the manifold 100, the pipe 200, and the welding ring 300 will be described in more detail with reference to FIG. 12. When the manifold 100, the pipe 200, and the welding ring 300 are configured in a cylindrical or ring shape, radii may be formed on the basis of a constant center point O. In this case, the projection part 310 of the welding ring 300 protrudes outward, and thus, a 3-2-th radius $R_1$, which is an outer radius of the projection part 310 of the welding ring 300, may be formed to be greater than a third radius R, which is an outer radius of the welding ring 300. In addition, at one end of the manifold 100, a first radius M, which is an outer radius, and a 1-1-th radius $M_0$, which is an inner radius, may be formed. Here, the 3-2-th radius $R_1$ is formed to be smaller than the first radius M but be larger than the 1-1-th radius $M_0$, such that the projection part 310 may be seated on one end surface of the manifold 100. In addition, the third radius R may be formed to have a length smaller than the 1-1-th radius $M_0$. Accordingly, when the welding ring 300 is molten, the welding ring 300 is accommodated in the space formed by the inner surface of the second body 102 of the manifold 100 and the outer surface of the pipe 200 as described above, and is entirely exposed to the outside, such that the occurrence of a welding defect may be prevented, and a phenomenon that the molten welding ring 300 overflows to the outside due to the welding ring 300 of the inner portion that is not molten may also be prevented. Here, the outer surface of the pipe 200 may also have a diameter formed as a second radius Y, and the second radius Y may be formed to correspond to the 3-1-th radius $R_0$, which is an inner radius of the welding ring 300. In this case, the 3-1-th radius $R_0$ may be formed to be greater than the second radius Y in consideration of assemblability.

Fourth Embodiment

Figure 13:
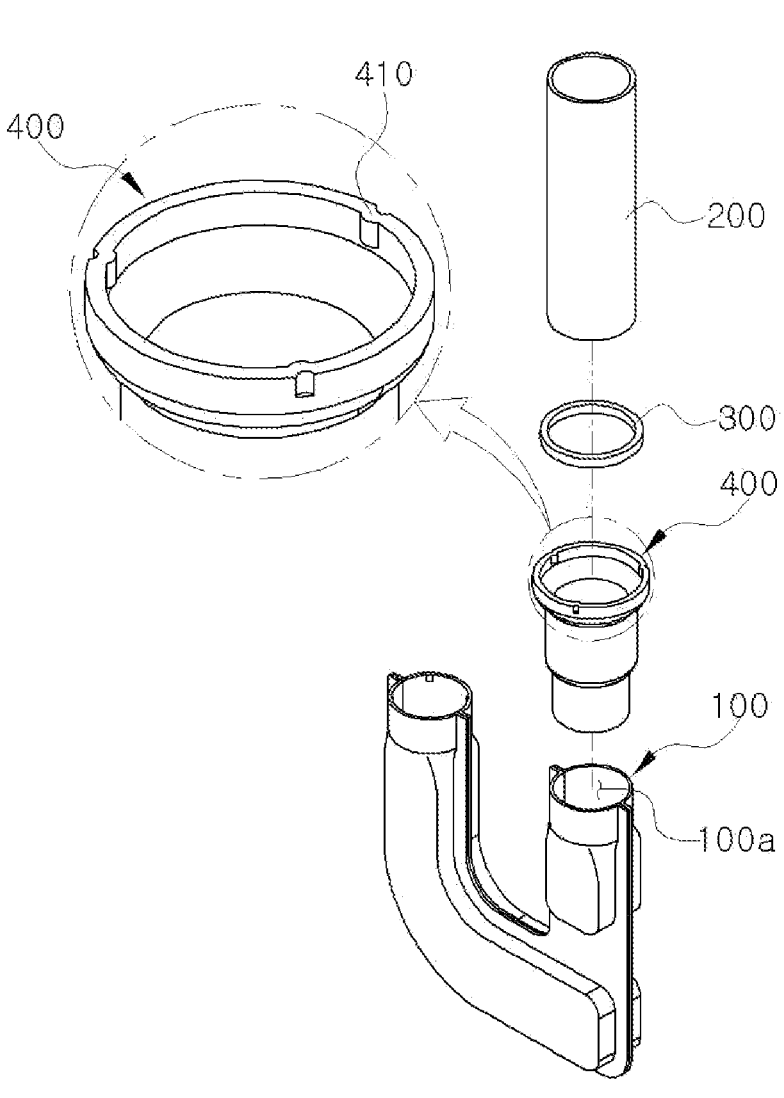
FIG. 13 is an exploded perspective view of a pipe connection assembly according to a fourth embodiment of the present invention.
Figure 14:
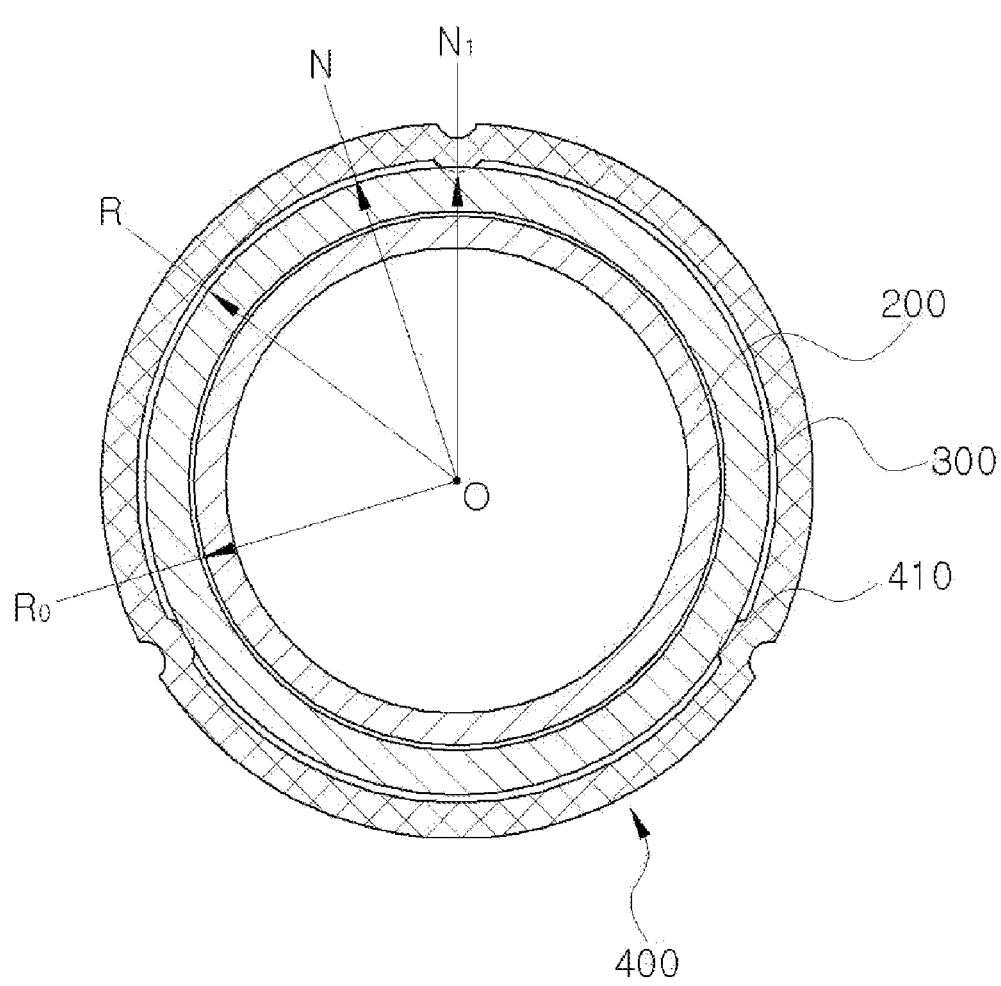
FIG. 14 is a plan cross-sectional view of the pipe connection assembly according to a fourth embodiment of the present invention.

FIGS. 13 and 14 illustrate a pipe connection assembly of a heat exchanger according to a fourth embodiment of the present invention, wherein FIG. 13 is an exploded perspective view of the pipe connection assembly, and FIG. 14 is a plan cross-sectional view of the pipe connection assembly.

Referring to FIG. 13, the pipe connection assembly according to the present invention further includes a connection body 400 connecting the manifold 100 and the pipe 200 to each other. In this case, protrusion parts 410 protruding inward may be formed on an inner surface of an upper end of the connection body 400, and the welding ring 300 may be seated on one end surfaces of the protrusion parts 410 and may be disposed to surround the outer surface of the pipe 200.

A structure between respective components will be described in more detail with reference to FIG. 14. As illustrated in FIG. 14, the connection body 400 includes the protrusion parts 410 protruding inward, and an inner side of the connection body 400 and an inner side of the protrusion part 410 may have inner diameters formed as a fourth radius N and a 4-1-th radius $N_1$, respectively, on the basis of a certain center point O. Here, the 4-1-th radius $N_1$ may be formed to be smaller than the fourth radius N. In addition, the welding ring 300 may have a third radius R, which is an outer radius, and a 3-1-th radius $R_0$, which is an inner radius, formed on the basis of the center point O, and the 3-1-th radius $R_0$ may be formed to be smaller than the fourth radius N but greater than the 4-1-th radius $N_1$. Accordingly, the welding ring 300 may be seated on the protrusion parts 410 of the connection body 400 and be exposed to the outside. In addition, the 3-1-th radius $R_0$ is formed to be greater than the second radius Y, which is the outer radius of the pipe 200, such that the welding ring 300 may be formed to surround the pipe 200. In addition, a space is formed between an inner surface of an upper end side of the connection body 400 and an outer surface of a lower end side of the pipe 200, and when the welding ring 300 seated on the protrusion part 410 is molten, the welding ring 300 may be accommodated in the space. Here, a plurality of protrusion parts 410 according to the present invention may be disposed to be spaced apart from each other along an inner circumferential surface of the connection body 400, and protrusion surfaces of the protrusion parts 410 may be modified into various forms such as a form in which they are parallel to or inclined with respect to one end surface of the connection body 400.

The present invention is not limited to the embodiments described above, and may be applied to various fields. In addition, the present invention may be variously modified by those skilled in the art to which the present invention pertains without departing from the gist of the present invention claimed in the claims.

The invention claimed is:

1. A pipe connection assembly of a heat exchanger connecting a header tank and a pipe of the heat exchanger to each other, comprising:

a manifold having one end connected to the pipe and the other end connected to an inner portion of the header tank so that a heat exchange medium flows; and a welding ring disposed at one end of the manifold so that the manifold and the pipe are fixedly coupled to each other, wherein the welding ring is disposed on one end surface of the manifold, wherein a space is formed between an inner surface of one end of the manifold and an outer surface of the inserted pipe, such that the welding ring is accommodated, wherein one end of the manifold includes a first body and a second body connected to one end of the first body and having an inner diameter greater than that of the first body, wherein the second body includes an extension member with an inner diameter of a 1-1-th radius, and a protrusion part with an inner diameter of a 2-2-th radius, formed by being hollowed out and projecting from the extension member, wherein the 2-2-th radius is smaller than the 1-1-th radius, wherein a portion of the welding ring is located to seat on the protrusion part, and wherein an inner diameter of the extension member is formed to be smaller than an outer diameter of the welding ring, such that another portion of the welding ring is located on the expansion member.

2. The pipe connection assembly of claim 1, wherein the second body has an inner diameter that becomes narrower toward the first body.

3. The pipe connection assembly of claim 1, wherein a portion of the pipe is depressed inward so that a clearance between an inner surface of the second body and the outer surface of the pipe increases.

4. The pipe connection assembly of claim 1, wherein the number of protrusion parts is plural, and the plurality of protrusion parts are disposed to be spaced apart from each other along an inner circumferential surface of the second body.

5. The pipe connection assembly of claim 1, wherein the welding ring has a projection part protruding outward and disposed on an outer surface thereof.

6. The pipe connection assembly of claim 5, wherein an outer diameter of the projection part is formed to be greater than an inner diameter of one end side of the manifold, such that the welding ring is disposed on one end surface of the manifold.

7. The pipe connection assembly of claim 5, wherein the number of projection parts is plural, and the plurality of projection parts are disposed to be spaced apart from each other along an outer circumferential surface of the welding ring.

8. A heat exchanger comprising:

a pair of header tanks disposed to be spaced apart from each other;

a core part including a plurality of tubes having both ends coupled to the pair of header tanks, respectively, and disposed to be spaced apart from each other in both side directions, and a plurality of fins interposed between the plurality of tubes; and the pipe connection assembly of claim 1 coupled to one or more of the header tanks among the pair of header tanks, wherein the heat exchange medium flowing inside the header tank is introduced or discharged through the pipe connection assembly.

* * * * *